US012589848B2

(12) United States Patent
Papadopoulos et al.

(10) Patent No.: US 12,589,848 B2
(45) Date of Patent: Mar. 31, 2026

(54) HYDROGEN TRANSPORT APPARATUS

(71) Applicants: Jeremy J Papadopoulos, Manchester (GB); Vincent Loccisano, Wellesley, MA (US)

(72) Inventors: Jeremy J Papadopoulos, Manchester (GB); Vincent Loccisano, Wellesley, MA (US)

( * ) Notice: Subject to any disclaimer, the term of this patent is extended or adjusted under 35 U.S.C. 154(b) by 435 days.

(21) Appl. No.: 18/489,231

(22) Filed: Oct. 18, 2023

(65) Prior Publication Data

US 2024/0166319 A1 May 23, 2024

Related U.S. Application Data

(60) Provisional application No. 63/384,281, filed on Nov. 18, 2022.

(51) Int. Cl.

| | |
|---|---|
| ***B63G 8/22*** | (2006.01) |
| ***B63B 79/15*** | (2020.01) |
| ***B63B 79/40*** | (2020.01) |
| ***B63G 8/00*** | (2006.01) |
| ***B63G 8/08*** | (2006.01) |

(52) U.S. Cl.

CPC ................ *B63G 8/22* (2013.01); *B63B 79/15* (2020.01); *B63B 79/40* (2020.01); *B63G 8/001* (2013.01); *B63G 8/08* (2013.01); *B63G 2008/005* (2013.01); *F17C 2203/0685* (2013.01); *F17C 2221/012* (2013.01); *F17C 2270/0128* (2013.01)

(58) Field of Classification Search

CPC . B63G 8/22; B63G 8/001; B63G 8/08; B63G 2008/005; B63B 79/15; B63B 79/40; B63B 43/06; F17C 2221/012; F17C 2270/0128; F17C 2203/0685

See application file for complete search history.

(56) References Cited

U.S. PATENT DOCUMENTS

| | | | | |
|---|---|---|---|---|
| 4,232,983 A * | 11/1980 | Cook | ...................... | B63B 25/08 220/8 |
| 11,987,443 B2 * | 5/2024 | Saeterdal | ............. | B65D 88/744 |
| 2016/0325927 A1 * | 11/2016 | Chitwood | ............ | B65D 90/046 |
| 2022/0274677 A1 * | 9/2022 | Chelaru | ................ | B63B 35/285 |

FOREIGN PATENT DOCUMENTS

| | | | | |
|---|---|---|---|---|
| GB | 2595321 A * | 11/2021 | ............... | B63G 8/42 |
| GB | 2608862 A * | 1/2023 | .............. | F17C 13/00 |
| WO | WO-2015075362 A1 * | 5/2015 | ................ | F17C 5/06 |
| WO | WO-2022221924 A1 * | 10/2022 | ............... | F03D 9/19 |

* cited by examiner

*Primary Examiner* — Andrew Polay

(74) *Attorney, Agent, or Firm* — Keeley DeAngelo LLP; W Scott Keeley

(57) ABSTRACT

A wind-turbine apparatus uses turbine-generated electrical energy to convert water to hydrogen in an electrolysis process, and stores the hydrogen in a subsea vessel. The submerged vessel is configured to contain and transport compressed hydrogen. By monitoring the vessel's hoop tension, ballast may be controlled to vary the buoyancy of the vessel. Electrical generating apparatus may use a wind turbine, water turbine or photovoltaic array, or combination thereof. The apparatus may employ an offshore fluid-turbine array or an onshore-turbine array combined with a photovoltaic array with associated fuel-synthesis hardware.

20 Claims, 5 Drawing Sheets

HYDROGEN TRANSPORT APPARATUS

TECHNICAL FIELD

The present disclosure relates in general to coastal renewable energy farms, and more specifically to offshore wind turbines that can store energy in deep water as compressed hydrogen.

BACKGROUND

A wind turbine is a rotating machine that converts kinetic energy from wind into mechanical energy, which is converted to electricity. Utility-scale, horizontal-axis wind turbines have horizontal shafts that are commonly pointed into the wind by a shaft and generator assembly within a nacelle, at the top of a tower that is yawed relative to the tower in order to align the rotor with the wind. Nacelles commonly house direct-drive generators or a transmission-and-generator combination.

Wind turbines used for offshore applications include single-tower systems mounted to the sea bed. Some float, using shallow submersible or semi-submersible platforms employing spars or spar buoys, tension legs, or a large-area barge-type construction. Offshore turbines are usually connected to a local power grid. Produced electrical energy is transferred and conditioned by grid structures.

Hydrogen generated from renewable energy sources is considered a carbon-free fuel. Electrolysis is the process of using electricity to split water into hydrogen and oxygen. The reaction takes place in an electrolyzer, which comprises an anode and a cathode separated by an electrolyte. Various electrolyte materials produce different types of electrolyzers. Common electrolyzers include solid-oxide electrolyzers, alkaline electrolyzers and polymer-electrolyte-membrane electrolyzers.

A polymer-electrolyte membrane (PEM) electrolyzer uses a solid polymeric material to split water at the anode to form oxygen and positively charged hydrogen ions. Electrons flow through an external circuit, and the hydrogen ions move across the PEM to the cathode. At the cathode, hydrogen ions combine with electrons from the external circuit to form hydrogen gas. The anode reaction is as follows:

$$\text{2H2O yields} \rightarrow O_2 + 4H^+ + 4e^-$$

The cathode reaction is as follows:

$$4H^+ + 4e^- \text{ yields} \rightarrow 2H_2$$

One skilled in the art understands that electrical energy from a wind-driven shaft may be employed to convert various raw materials to fluid fuels by various processes. For clarity, the present application refers to the conversion of electrical energy to hydrogen, followed by the incorporation of this hydrogen into a clean fuel such as ammonia. "Clean" means that carbon is not emitted in creating the fuel. Any carbon emitted in using the fuel was previously taken from the atmosphere to create the fuel.

Increased adoption of renewable electricity challenges utilities to balance supply and demand on an energy-distribution grid. When the wind blows harder than needed, generation must be curtailed because customers cannot use it. Conversely, when the wind blows less than needed, customers cannot be served unless there is a stored energy option or a backup, fuel-powered generating plant.

Safe storing and transporting hydrogen dictates that hydrogen gas be compressed at ambient temperature, or cooled below −400° F. to the liquid state; or that liquids or solids are used to absorb hydrogen for safe storage.

Hydrogen compressed at ambient temperatures will not liquefy. In some instances, hydrogen is compressed to 700 bar (>10,000 psi) and stored in high-quality tanks or high-strength pipes. Compression at ambient temperatures is not sufficiently dense to allow for efficient transport of tons of hydrogen.

If available, natural-gas pipelines may be used for hydrogen transport.

Hydrogen cooled below −400° F. may be liquefied by medium pressures and stored in tanks. The process is inefficient because the amount of hydrogen stored is not significant and the liquefying equipment greatly increases the cost of hydrogen production. Pipe transport of liquid hydrogen is infeasible because the pipes cannot be kept reliably cold over long distances.

Liquids such as toluene, and solids that absorb hydrogen for safe storage are expensive and heavy.

Cylindrical vessels are used in the storing of pressurized fluids. Pressure inside and outside the vessel is subject to loading from all directions. Cylinder stress is a stress distribution with rotational symmetry, remaining unchanged if a stressed object is rotated about a fixed axis. Hoop stress or circumferential stress is a type of cylinder stress that runs tangential to a vessel's circumference. Axial stress runs parallel to the axis of cylindrical symmetry. Radial stress runs coplanar with and perpendicular to the symmetry axis.

One skilled in the art understands that the term "secondary fluid" may refer to compressed air or a compressed inert gas or the like. One skilled in the art also understands that the term "fluid" may refer to a liquid or a gas as both are fluids.

SUMMARY

A wind-turbine apparatus uses turbine-generated electrical energy to convert water to hydrogen in an electrolysis process, and stores the hydrogen in sub-sea tanks. The apparatus may use a wind turbine, water turbine or photovoltaic array, or combination thereof. The apparatus may employ an offshore fluid-turbine array or an onshore-turbine array combined with a photovoltaic array with associated fuel-synthesis hardware. One skilled in the art understands that a fluid turbine may be a water turbine or a wind turbine.

In some embodiments, a polymer electrolyte membrane (PEM) electrolyzer converts sea water into hydrogen gas. Gaseous hydrogen may be stored in tanks that may be located on the ocean floor. In some embodiments, sub-sea hydrogen storage tanks are cylindrical vessels or shells containing or lined with gas-impermeable bladders or concrete forms. Such vessels may be located 500-3000 meters beneath the water's surface, providing sufficient compression to achieve low-volume (hence low-cost) compressed hydrogen storage.

A fluid turbine, fluid-turbine array, or photovoltaic array can generate and store excess hydrogen, providing adequate power independent of wind. Hydrogen may be stored in the ocean in water deeper than 3,500 m, where the pressure is approximately 5,000 psi. Transportation from a deep-production terminus to a deep-receiving terminus is cost-effective when performed at similar depths. The transporter may be powered or towed to any location near the deep water, where it may be sent ashore for energy generation.

In an example embodiment, a submerged vessel stores hydrogen at a specified sea depth. A sea depth allows pressurized storage of gasses like hydrogen, which can be dangerous to pressurize and store on land. Sensors on the storage tank include tension hoops that measure inner and outer pressure on the storage tank. High pressure in the tank stretches the hoops and signals a control system to increase the vessel's ballast to have it drop to a deeper depth of higher pressure.

When transporting hydrogen in a low-strength submerged vessel, it is necessary to maintain the hydrogen pressure substantially equal to the surrounding water pressure so as not to damage the vessel walls. Differential pressure transducers or wall-stress sensors in the hull are monitored to detect any difference between internal and external pressure. A weight of water ballast is pumped in or out in response to the pressure difference and its rate of change. By monitoring the pressure difference, the weight of ballast may be controlled to vary the buoyancy of the vessel to keep it near a specified depth. Internal pressure that exceeds external water pressure is evident in the vessel's rising in the water, so increasing ballast will reduce the vessel's buoyancy and increase its depth. Conversely, an internal pressure that is less than the external water pressure means that the vessel has dropped in the water; decreasing the ballast will increase its buoyancy, causing it to rise.

One skilled in the art understands that increased hoop stress is evident in the vessel's rising in the water, and that increasing the ballast will reduce the vessel's buoyancy, causing it to sink, and that hoop tension is relieved with increased water pressure. Similarly, decreased hoop tension is evident in the vessel's sinking, and decreased ballast may cause it to rise in the water. Ballast may be decreased until the hoop tension is returned to a normal range. One skilled in the art understands that various environmental factors may alter a vessel's buoyancy. Temperature or salinity, for example, may change the buoyancy of a vessel.

A deeply submerged vessel must keep at substantially constant internal pressure when taking on or discharging a hydrogen payload, or it will be damaged. It must also maintain its buoyancy, or it will require substantial support force to prevent sinking or rising. When adding or removing hydrogen it is desirable to subtract or add a compensating volume of a secondary fluid. The process of exchanging hydrogen for a secondary fluid includes a first step of producing hydrogen and intermittently compressing it for deep storage by the release of deeply stored fluid, and a second step of exchanging a secondary fluid in the vessel for the stored hydrogen to replenish the deeply stored fluid. Where hydrogen is being generated, a vessel arrives with a cargo of high-pressure fluid, which is discharged as it is replaced by a load of hydrogen. Where hydrogen is delivered by the vessel, high-pressure fluid must be supplied to replace it. The hydrogen-filled vessel is towed or propelled to a hydrogen-delivery site, where it exchanges its compressed hydrogen for a store of a secondary fluid. Lastly, the stored hydrogen is expanded for delivery to users, in the process replenishing the secondary fluid store. For energy efficiency, it is best for the fluid being discharged or supplied to exchange work with the hydrogen being supplied or discharged. A coupled turbine and compressor can be used to achieve this. The hydrogen being discharged for use will expand through a turbine, which drives a compressor producing a secondary fluid, which in some embodiments is compressed air, to take its place. In some cases the hydrogen being supplied can be compressed by exiting fluid that expands through a turbine. Alternatively the exiting fluid can generate electricity, which can be used to generate more hydrogen.

When exchanging a secondary fluid for compressed hydrogen in the vessel, or vice versa, it is necessary to prevent gas intermingling, as the mixture is explosive. One approach is to use a bladder or several bladders dedicated uniquely to each gas. Another is to divide the vessel into compartments and pump water from one compartment to another, such that the two gasses are always separated by a volume of water. A third approach is to strongly couple the transport vessel to a heavy transfer system with some full bladders (balancing its weight) and some empty bladders. The transport vessel can fully empty its gas into some transfer bladders while taking on water. The increased buoyancy of the transfer system will prevent the transport vessel from sinking. Then the other transfer bladders can completely fill the vessel, displacing its temporary water cargo, and making it once again neutrally buoyant.

The submerged vessel has a streamlined shape and may be towed or self-propelled. If it is not towed by a submarine or surface ship, in some embodiments the vessel is propelled by a hydrogen-powered internal-combustion engine, which requires a store of oxygen. In another embodiment, stored oxygen is combined with some of the hydrogen to operate a fuel cell for electric propulsion.

DESCRIPTION

Figure 1:
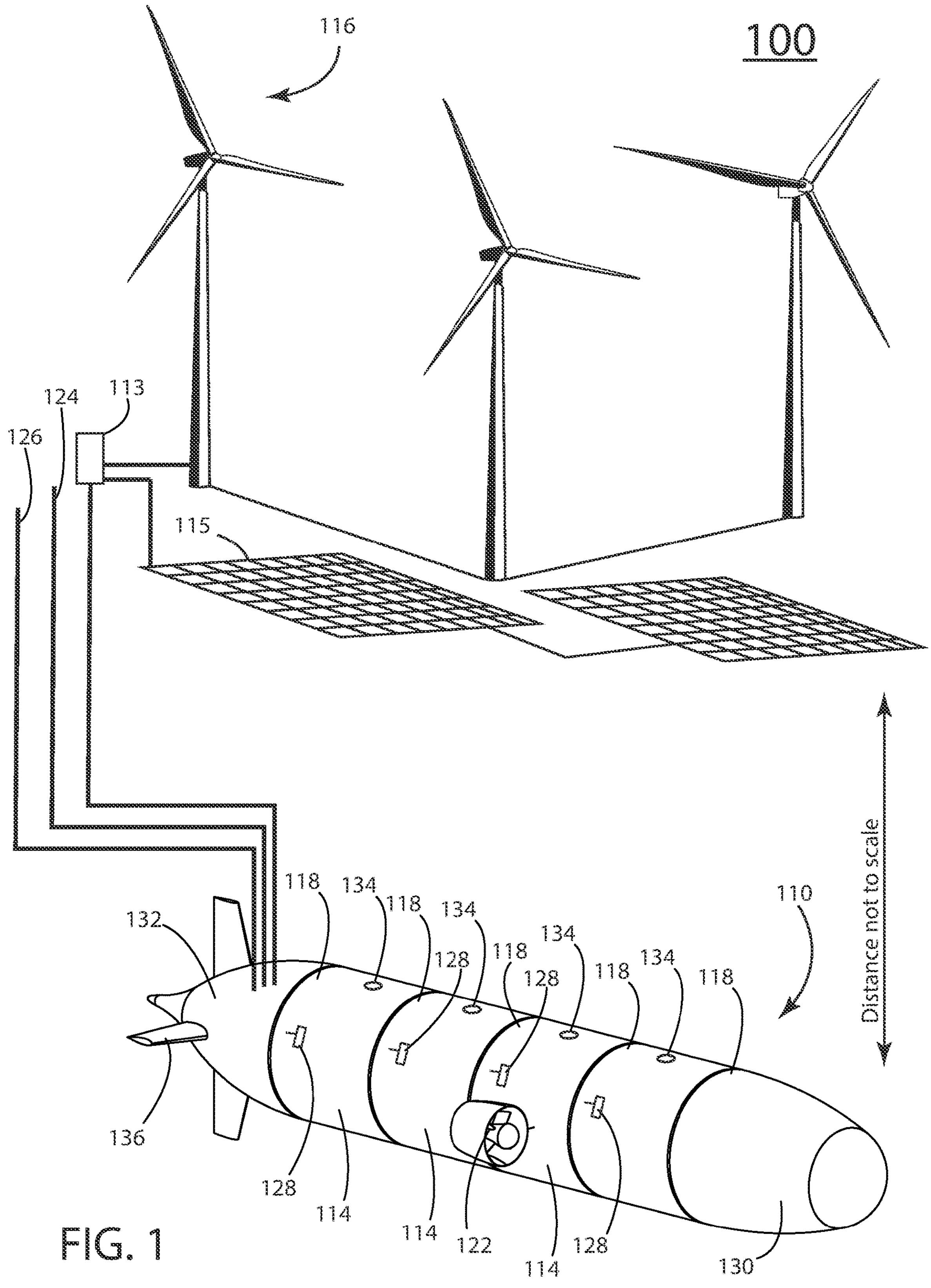
FIG. 1 is a perspective view of an example embodiment.

FIG. 1 shows example embodiment 100 where at least one wind turbine 116 singularly or in an array. In some embodiments at least one solar panel 115 in an array may be coupled with the wind-turbine array. Electricity generated by the facility may be directed to an electrolyzer 113 where water is converted into hydrogen and moved to a vessel 110 that resides beneath the ocean surface. One skilled in the art understands that electrical energy may be generated onshore or offshore and transferred to an electrolyzer located onshore; on or near an offshore turbine; or proximal to a submerged vessel 110 located beneath the ocean surface wherein hydrogen is transferred from the electrolyzer to the vessel for storage and transport.

Figure 2:
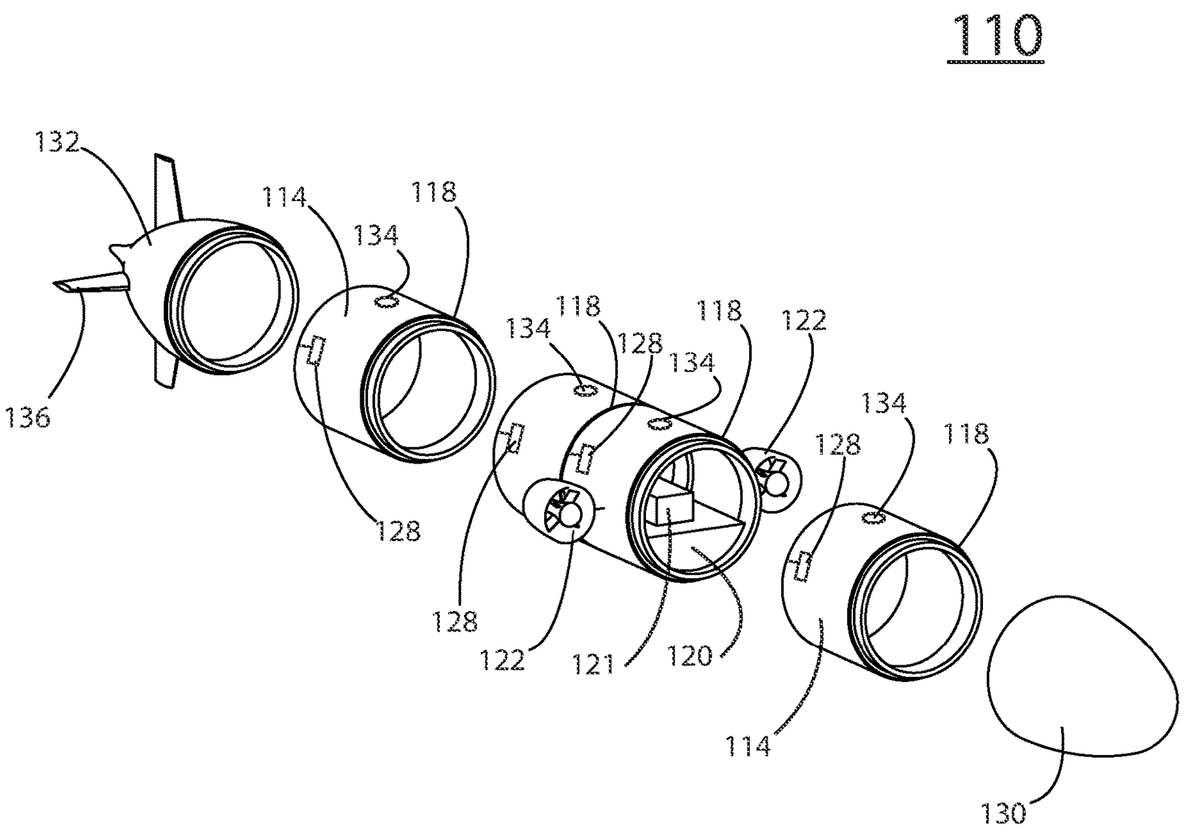
FIG. 2 is perspective, partially exploded view thereof.
Figure 3:
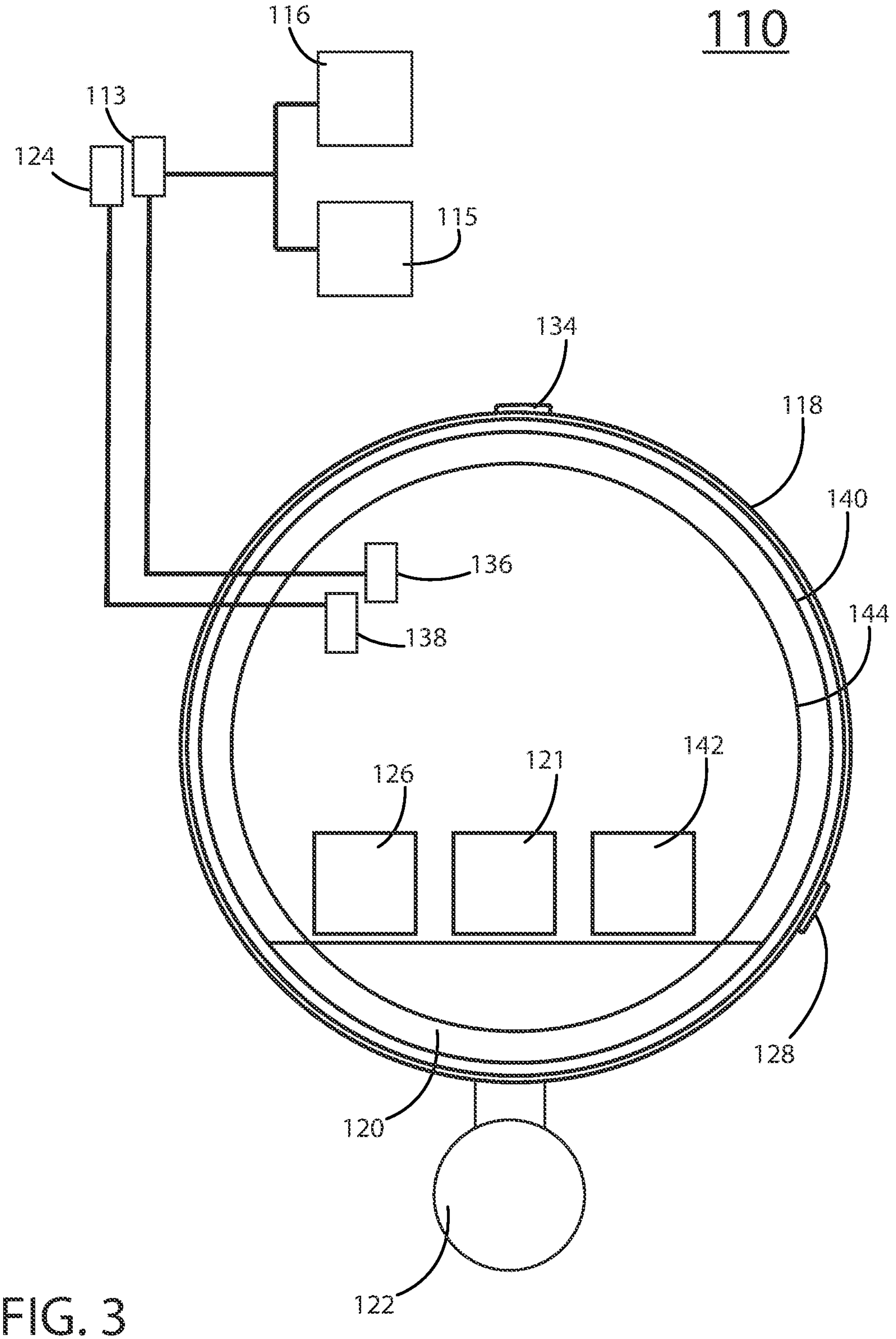
FIG. 3 is a diagram of the embodiment of FIG. 1.

The illustration in FIG. 2 and the diagram of FIG. 3 show an example embodiment of the submerged vessel. The submerged vessel is configured to contain and transport compressed hydrogen from a production location to a use location. It uses common, flanged-pipe segments fitted with a stern section and a bow section. One skilled in the art is familiar with flanged-pipe segments such as those used to form culverts and the like. The vessel is monitored to detect any difference between internal and external pressure and is moved to a watery depth that equalizes the internal pressure. In some embodiments a bladder 140 lines the interior of the assembled flanged-pipe segments. In other embodiments a second bladder 144 is used to contain a secondary fluid which is supplied to the vessel as stored hydrogen is removed.

A controller 121 monitors strain gauges 128 that in turn monitor strain on tension hoops 118 and differential pressure transducers 134 that measure the difference in pressure between the inside and outside of the vessel 110. The controller also controls a pump 126 to move ballast in or out of a ballast tank 120 and controls a first valve 136 for receiving or releasing hydrogen, and a second valve 138 for receiving and releasing a secondary fluid from a compressor 124. In some embodiments an electrolyzer 142 converts a portion of stored hydrogen to electrical energy for driving a propulsion apparatus 122 to move the vessel 110.

Tension hoops 118 surround the vessel 110 and are monitored by strain gauges 128. In other embodiments, differential pressure transducers 134 measure the difference between pressure inside the vessel and outside the vessel. One skilled in the art understands that differential pressure transducers, tension hoops and the like may be fitted to a hull and monitored to detect any difference between internal and external pressure. A volume of ballast is increased or decreased in response to signals from tension-hoop sensors 128 or differential transducers 134 that are sent to the controller 121, where calculations are computed to determine the amount of ballast required to move the vessel 110 to the appropriate depth to provide the correct counter-pressure inside the vessel 110. Water ballast contained in a compartment or bladder 120 is pumped in or out of the otherwise sealed vessel in response to the pressure difference, which arises due to the vessel being higher or lower than a pressure-matched optimum altitude in the ocean. A control system 121 monitors sensors and controls valves and pumps to control the vessel internal pressure. According to signals from the control system 121, a fluid-pumping apparatus 142 moves ballast in or out of the vessel through conduit. By monitoring the pressure difference and its rate of change, the weight of ballast may be controlled to vary the vessel buoyancy, so as to keep it at a given depth where the ocean pressure matches that of the stored hydrogen, thereby minimizing stress in the vessel walls.

The vessel 110 may be towed or in some embodiments may be configured with a remote-controlled drive mechanism 122 so that the vessel 110 may be driven to a location for the delivery of the hydrogen.

In an example embodiment a nose cone 130 covers the bow of the vessel while a tail section 132 is equipped with hydroplanes 136 to pitch the vessel's bow or stern up or down to control the direction of the vessel. In this example embodiment the hydroplanes 134 are remotely controlled.

One skilled in the art understands that various types of clean energy sources may be employed or combined for the intended outcome of generating hydrogen from clean energy sources. For example a wind turbine and a tidal turbine may be interchanged for the purpose of this disclosure. The functional characteristics of a wind turbine may be replaced by the functional characteristics of a water turbine. For clarity, the disclosure refers to a wind turbine.

Figure 4:
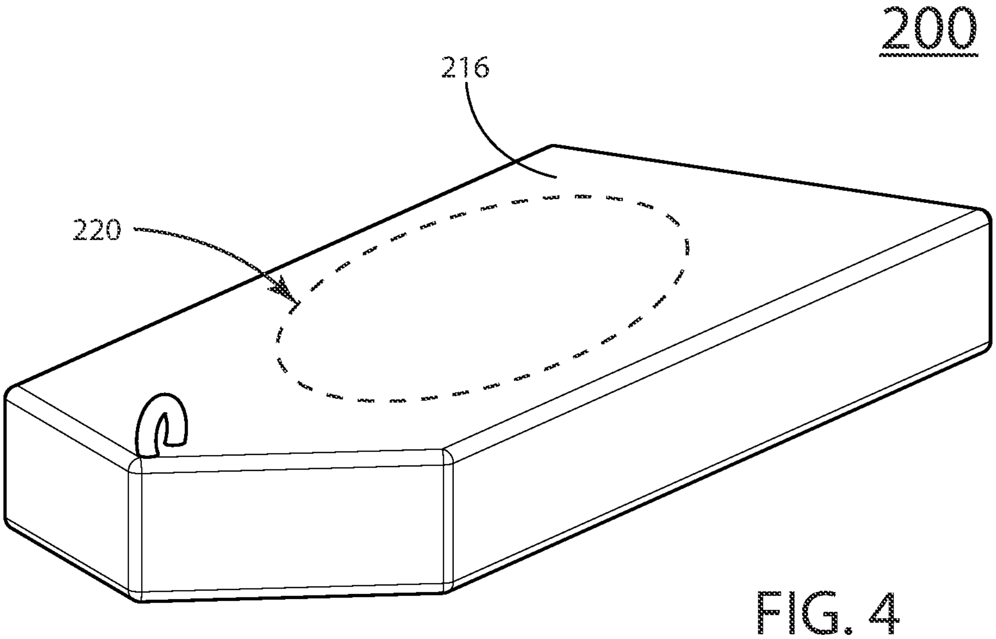
FIG. 4 is a top-perspective view of an iteration of the embodiment.
Figure 5:
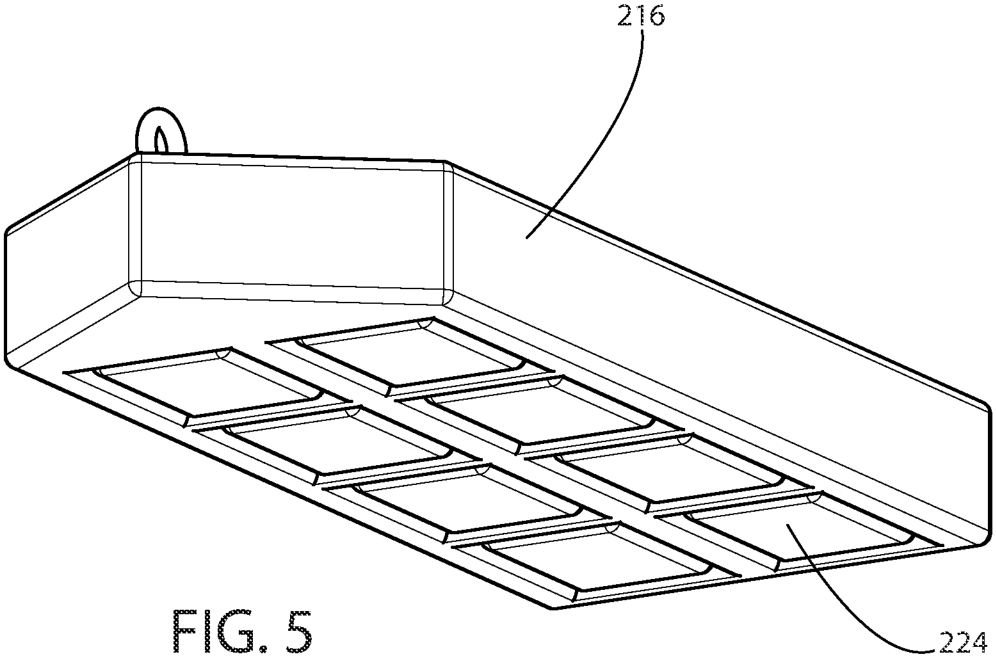
FIG. 5 is a bottom-perspective view of the iteration of FIG. 4.
Figure 6:
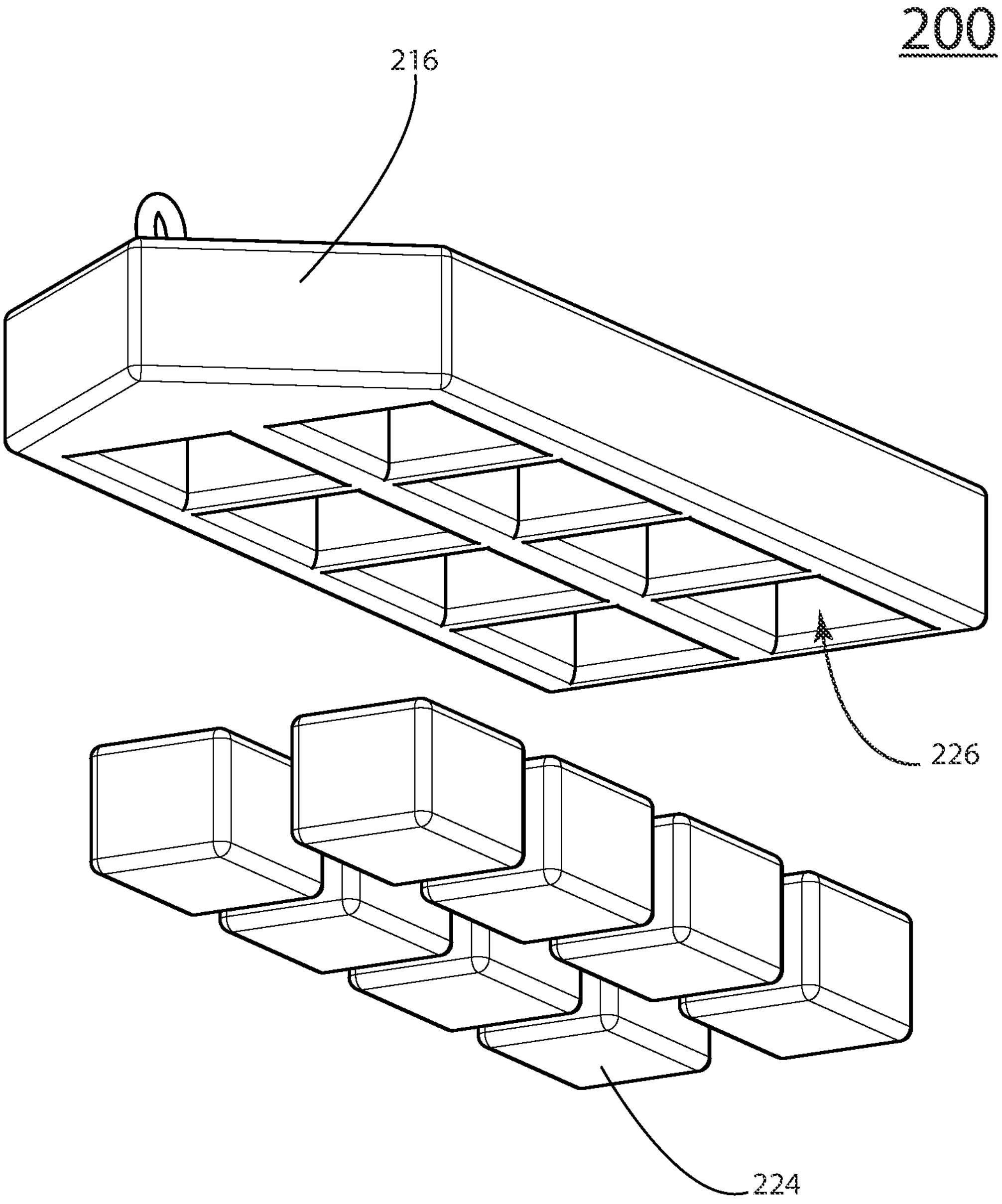
FIG. 6 is a perspective, exploded view of the iteration of FIG. 4.

FIG. 4, FIG. 5 and FIG. 6 show an iteration of the vessel 216. A volume of ballast 220, confined to a mid-length sealed compartment, in combination with a bi-directional pump, may control the buoyancy of the vessel. The vessel 216 has containers 226 that house bladders 224. Bladders 224 may be filled with hydrogen and the vessel 216 may be towed to a location for the delivery of hydrogen. One skilled in the art understands that such bladders may be interchangeably filled with a secondary fluid or hydrogen, and that a similar concept may be applied to the iteration in FIG. 1 and FIG. 2.

The invention claimed is:

1. A submerged vessel for containing and transporting hydrogen comprising:

a cylindrical shell lined with a plurality of bladders for containing hydrogen under water; and at least one ballast compartment in said vessel; and at least one pump for increasing and decreasing ballast in said at least one ballast compartment; and at least one tension hoop surrounding said shell; and at least one sensor coupled with said at least one tension hoop; and at least one valve engaged with a conduit for receiving and releasing hydrogen; and at least one valve engaged with a conduit for receiving and releasing ballast; and a control system for monitoring signals from said at least one sensor and for receiving and releasing hydrogen; and for receiving and releasing ballast; wherein hydrogen is stored at a given pressure by controlling ballast and by increasing ballast in response to increased hoop tension and by decreasing ballast in response to decreased hoop tension, according to signals from said at least one sensor on said at least one tension hoop, sent to said control system.

2. The apparatus of claim 1 further comprising:

said at least one sensor measures tension on said tension hoop.

3. The apparatus of claim 1 further comprising:

said at least one sensor includes an external temperature sensor; wherein said external temperature sensor measures the external temperature and sends signals to said control system to determine if changes in external temperature affect the buoyancy of the vessel.

4. The apparatus of claim 1 further comprising:

said at least one sensor includes an external salinity sensor; wherein said external salinity sensor measures the external salinity and sends signals to said control system to determine if changes in external salinity affect the buoyancy of the vessel.

5. The apparatus of claim 1 further comprising:

at least one valve engaged with a conduit for receiving and releasing a secondary fluid; wherein as hydrogen is received in said submerged vessel, said secondary fluid is released; and as hydrogen is released from said submerged vessel, said secondary fluid is received.

6. The apparatus of claim 5 further comprising:

a first bladder for containing hydrogen and a second bladder for containing a secondary fluid.

7. The apparatus of claim 5 further comprising:

at least one differential pressure transducer fixedly engaged with said vessel and in communication with said control system; wherein the at least one differential pressure transducer measures and communicates the difference in pressure between the inside of the vessel and an environment surrounding said vessel; and a set pressure is maintained as ballast is increased to increase pressure inside the vessel and ballast is decreased to decrease pressure inside the vessel.

8. The apparatus of claim 7 wherein:

a feedback loop occurs as differential pressure is measured and ballast is increased or decreased in response to the differential pressure measurement.

9. The apparatus of claim 8 wherein;

said feedback loop is monitored in real time.

10. The apparatus of claim 1 wherein:

said submerged vessel is comprised of a plurality of flanged-pipe segments fitted with a stern section and a bow section.

11. The apparatus of claim 1 further comprising:
a propulsion apparatus remotely controlled; wherein
said propulsion apparatus moves said submerged vessel as remotely controlled.

12. The apparatus of claim 1 further comprising:
a propulsion apparatus remotely controlled; wherein
said propulsion apparatus dynamically anchors said submerged vessel as remotely controlled.

13. The apparatus of claim 11 further comprising:
an electrolyzer in said submerged vessel; wherein
said electrolyzer converts a portion of stored hydrogen in said submerged vessel to run said propulsion apparatus to move said submerged vessel as remotely controlled.

14. A method for using the apparatus of claim 1, the method comprising:
providing at least one source of clean energy; and
employing said clean energy to run an electrolyzer to generate hydrogen from a water source; and
transferring said hydrogen to the submerged vessel of claim 1 through said at least one conduit engaged with a valve for receiving and releasing hydrogen; and
maintaining a given pressure inside said submerged vessel by:
monitoring the signal from said at least one sensor on said at least one tension hoop; and
controlling, with said controller, said at least one pump for increasing and decreasing ballast, in response to said signal from said at least one sensor; wherein
reducing ballast in response to a signal denoting reduced tension on said tension hoop; and
increasing ballast in response to a signal denoting increased tension on said tension hoop, thus moving said submerged vessel to a depth that maintains said given pressure inside said submerged vessel; and
containing said hydrogen at a safe pressure while transporting said hydrogen.

15. The method of claim 14 wherein said submerged vessel is towed to a location for delivery of said hydrogen.

16. The method of claim 14 wherein said given pressure is equal to a pressure in the ambient environment surrounding said submerged vessel.

17. The method of claim 14 wherein said given pressure is between −20 psi and +20 psi.

18. A method for using the apparatus of claim 9, the method comprising:
providing at least one source of clean energy; and
employing said clean energy to run an electrolyzer to generate hydrogen from a water source; and
transferring said hydrogen to the submerged vessel of claim 1; and
maintaining a given pressure inside said submerged vessel by:
monitoring, with said controller, the signal from said at least one sensor on said at least one tension hoop; and
monitoring, with said controller, the signal from said at least one differential pressure transducer; and
controlling, with said controller, said at least one pump for increasing and decreasing ballast, in response to said signal from said at least one sensor and said signal from said at least one differential pressure transducer; wherein
reducing ballast in response to a signal denoting reduced tension on said tension hoop, and said differential pressure transducer; and
increasing ballast in response to a signal denoting increased tension on said tension hoop, and said differential pressure transducer, thus
moving said submerged vessel to a depth that maintains said given pressure inside said submerged vessel; and
containing said hydrogen at a safe pressure while transporting said hydrogen; and
delivering said hydrogen to a container above a water surface; and
receiving a secondary fluid through said valve engaged with a conduit for receiving and releasing a secondary fluid; wherein
said given pressure is maintained while hydrogen is contained and transported and delivered.

19. The method of claim 17 wherein said given pressure is equal to a pressure in the ambient environment surrounding said submerged vessel.

20. The method of claim 17 wherein the difference between the ambient pressure surrounding the vessel and said given pressure is between −20 psi and +20 psi.

* * * * *